July 5, 1938.                J. W. LEIGHTON                2,123,089
          ADJUSTABLE CONNECTION FOR WHEEL SUSPENSION OR THE LIKE
                          Filed Jan. 20, 1938
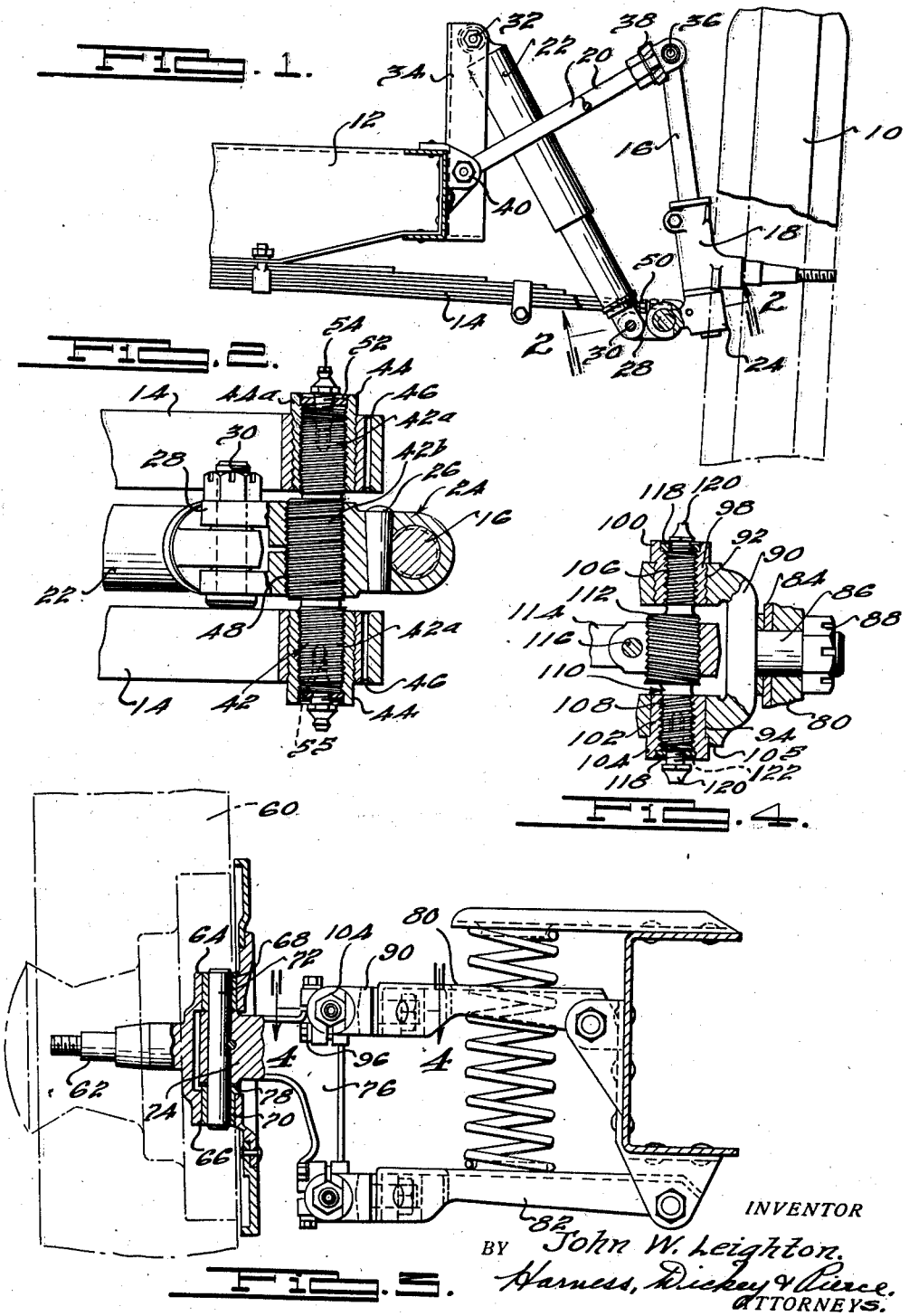
INVENTOR
BY John W. Leighton.
Harness, Dickey & Pierce.
ATTORNEYS.

Patented July 5, 1938

2,123,089

UNITED STATES PATENT OFFICE 2,123,089

ADJUSTABLE CONNECTION FOR WHEEL SUSPENSION OR THE LIKE

John W. Leighton, Port Huron, Mich.

Application January 20, 1938, Serial No. 185,794

6 Claims. (Cl. 280—124)

The present invention relates to vehicle wheel suspensions, and to improved adjustable joints. In the specific forms illustrated, the invention is directed to the provision of improved means for varying the caster and camber angles of a vehicle wheel suspension.

The present invention is a continuation in part of applicant's co-pending application, Serial No. 31,986, filed July 8, 1935, and is also closely related to applicant's co-pending applications, Serial No. 698,715, filed November 18, 1933, and Serial No. 107,536, filed October 26, 1936.

The principal objects of the present invention are to provide an improved wheel suspension for vehicles, characterized as embodying economically manufactured and readily adjustable means for adjustably determining the caster and camber angles; to provide such a suspension characterized as embodying a pin having first and second eccentrically related threaded portions; to provide such a suspension, including a wheel supporting member, a member connected to the vehicle, and a pin forming a pivotal connection between the two members, the pin being characterized as including two eccentrically related threaded portions, one of the portions being adapted to be locked to one of the members and the other threaded portion being adapted to turn in the other member; to provide such a suspension in which the threads in the two portions are of different pitch relative to each other, so that turning of the pin about its own axis modifies both the camber and caster angles.

Further objects of the invention are to provide an improved adjustable joint, characterized as embodying first and second members adapted to be pivotally connected to each other by a pin, the pin having first and second eccentrically related threaded portions; to provide such a joint embodying means to non-rotatably secure one of the threaded portions within one of the members, the other threaded portion being rotatably secured within the other member; and to provide such a joint characterized in that the threads in one of the pin portions are of different pitch than the threads in the other pin portion.

With the above, as well as other objects in view which appear in the following description and in the appended claims, preferred but illustrative embodiments of the invention are shown in the accompanying drawing, throughout the several views of which corresponding reference characters are used to designate corresponding parts, and in which:

Figure 1 is a view in elevation of a front wheel suspension embodying the invention;

Fig. 2 is a fragmentary view in horizontal section, taken along the line 2—2 of Fig. 1;

Fig. 3 is a view in front elevation of a wheel suspension embodying a modification of the invention; and, Fig. 4 is a view in horizontal section, taken along the line 4—4 of Fig. 3.

In Figs. 1 and 2, an illustrative vehicle wheel 10 is connected to the vehicle frame 12 by a suspension which includes a pair of similar conventional leaf type cross-springs 14, a kingpin 16, a knuckle bracket 18, a connecting link 20, and a suitable shock absorber 22.

The knuckle bracket 18 is pivotally connected to the kingpin 16, to permit the usual steering movement of the wheel 10, and preferably, though not necessarily, the pivotal bearing between the bracket 18 and the kingpin 16 is of the threaded type, the kingpin 16 being externally threaded, and the knuckle bracket 18 being internally threaded.

The lower end of the kingpin 16, which is externally threaded, is threadably received within an internally threaded aperture formed in a bracket 24, and is adapted to be locked in place therein by a usual locking pin 26. The bracket 24 is also provided with a clevis 28, within which the lower end of the shock absorber 22 is pivotally secured by means of the stud 30. The upper end of the shock absorber 22 is pivotally connected, as indicated at 32, to a bracket 34 which projects upwardly from the frame 12. The upper end of the kingpin is suitably and pivotally connected, as indicated at 36, to a member 38 secured in one end of the connecting link 20. The other end of the link 20 is correspondingly connected to the vehicle frame by a joint 40.

The outer ends of the leaf springs 14, which are arranged in generally spaced parallel relation, are connected to the previously mentioned bracket 24 through the improved joint of the present invention.

As illustrated, the pin 42 which forms the connecting member of the improved joint, comprises the two similarly formed and axially aligned portions 42a, and an intermediate portion 42b, the axis of which is parallel to the axis of portions 42a but is laterally offset or eccentric with respect to them. The end portions 42a are exteriorly threaded with threads of corresponding hand and pitch, and the intermediate portion 42b is correspondingly threaded.

In accordance with the arrangement disclosed and claimed in applicant's Patent No. 1,924,448, granted August 29, 1933 bushings 44 are interposed between the end portions 42a and the bearing bosses 46 which are formed at the ends of the springs 14. The bushings 44 are internally threaded with threads which mate with the threads on the portions 42a, and are externally threaded with threads of corresponding pitch but more lightly cut. The external threads on the bushings 44 mate with correspondingly lightly cut threads formed in the bearing bosses 46. The arrangement is such that during assembly, the bushings 44 are turned sufficiently far into the bosses 46 so that the unthreaded end portions 44a thereof wedge against the outer faces of the spring ends, and lock the bushings against rotation within the bosses. The pivoting movement between the pin portion 42a and the spring 14 occurs, accordingly, as a rotative movement of the pin portions 42a within their corresponding bushings 44.

The intermediate portion 42b is threaded into a corresponding internally threaded and split aperture 48 formed in the previously mentioned bracket 24, and is adapted to be locked in place therein by a conventional take-up stud 50 (Fig. 1).

The assembly of the joints shown in Figs. 1 and 2 may follow the procedure outlined in the above identified patent, it being noted, that while the intermediate portion 42b is larger than the end portions 42a, it is smaller than the openings provided in the bearing bosses 46. Briefly, the assembly procedure consists in bringing the two spring ends of the bracket 24 to substantially the relative positions shown, moving one end portion 42a of the pin through the opening 48, and thereafter threading the portion 42b into the opening 48 to a position in which the pin 42 is substantially centered between the springs 14. Thereafter the bushings 44 may be threaded into the corresponding bearing bosses and onto the corresponding pin portions to their finally locked positions in which they are wedgingly held against turning movement.

It will be appreciated that the suspension for the opposite wheel 10 may and preferably does duplicate the just described arrangement, and that the springs 14 extend entirely across the vehicle and so are common to both wheels. It will further be understood that in operation, a vertical movement of either wheel 10 relative to the frame, is resisted by the springs 14 as well as by the associated shock absorber 22. Any such vertical movement results in a pivotal movement of the springs 14 relative to the kingpin bracket 24, this pivotal movement appearing as a turning movement of the pin portions 42a within the bushings 44. The wheel movement is also accompanied by a pivoting movement of the kingpin 16 relative to the connecting link 20 about the joints 36, and by a pivotal movement of the links 20 relative to the frame about the joints 40.

Coming now to the camber adjusting feature of the present invention, it will be noted that the ends of the bushings 44 are closed by Welch plugs 52, provided with lubricant fittings 54. The plugs 52 are readily removable, and one or both ends of the pin 42 may be provided with a squared tool receiving recess 55, by which the pin 42 may be turned about the axis of the portions 42a, upon releasing the take-up stud 50. Any such rotative movements of the pin 42 causes the intermediate portion 42b to move bodily, correspondingly moving the lower end of the kingpin 16 inwardly or outwardly relative to the position of the upper end thereof. This inward or outward movement, as will be appreciated, causes a corresponding adjustment of the camber of the wheel 10.

In the just described arrangement, the leads of the threads on the end and intermediate portions 42a and 42b of the pin 42 correspond to each other, so that the just described adjusting movement of the pin 42 does not alter or cause any change in the position of the lower end of the kingpin forwardly and rearwardly of the vehicle. The adjustment affored by the pin 42, accordingly, has to do with the camber of the wheels 10, but does not alter the caster angle of these wheels.

The modified arrangement shown in Figs. 3 and 4 distinguishes primarily from the just described arrangement in that the intermediate portion of the corresponding threaded pin is provided with threads of opposite hand to those on the end portions. With this arrangement a rotation of the pin alters the camber angle of the associated wheel in the same manner as described above and in addition, by virtue of the opposite lead of the threads in the intermediate portion, causes a corresponding adjustment of the caster angle of the associated wheel.

Referring particularly to Figs. 3 and 4 one of the front wheels is indicated at 60 and is rotatably mounted on a spindle 62 that may be integral with upper and lower bearing portions 64 and 66 that have sleeve bearings 68 and 70 therein respectively for receiving a kingpin 72. The pin 72 projects through a portion 74 of a mounting member 76 disposed between the bearing portions 64 and 66, and a thrust bearing 78 may be disposed between the lower sleeve bearing and the portion 74. The wheel may turn on the pin 72 for steering purposes.

Upper and lower ends of the mounting member 76 are pivotally connected to the free ends of the link members 80 and 82 so as to provide substantially a parallelogram linkage which will allow vertical movement of the wheel relative to the frame without substantially changing the vertical plane of the wheel. The present invention is concerned principally with the pivotal connections between the free ends of the link members 80 and 82 and the upper and lower ends of the member 76 and particularly with an adjustable pivotal connection which will enable varying the castering and camber angles of the wheel suspension.

Referring now to Fig. 4, the outer and base portion of the link member 80 has an apertured bracket plate 84 secured thereto and a stem 86 projects through the aperture to the inner side of the bracket where it is threaded into a nut 88. For preventing release of the nut, the latter may have openings for receiving a cotter pin projecting through an opening in the threaded portion of the stem. At its outer end the stem is integral with a bifurcated arm 90 having one end provided with a threaded opening 92 and its other end formed with a split portion having a non-threaded opening 94. A clamping bolt 96 may be used to draw up the ends of the split portion for a purpose to be mentioned hereinafter. The threaded opening 92 receives a threaded bearing bushing 98 constructed of hard metal that has a hex portion 100 for turning the bushing as well as limiting its inward threaded movement. The opening 94 slidably receives a hard metal bushing 102 that has a hex head 104 thereon and once this bushing is in place it is prevented from turning by a projection 105 on the end of the arm 90 which extends along one face of the hex head as will be readily understood. Both of the bushings 98 and 102 are internally threaded alike for receiving threaded end portions 106 and 108 of a hard metal pivot pin 110 and the threads are fairly deep to provide a more efficient bearing arrangement between the pin and bushings. The pitch and direction of the external threads on bushing 98 and in opening 92 are the same as that of the internal threads on the bushings and on the ends 106 and 108 of the pin, but are relatively shallow so as to obtain more of a wedging engagement between such external threads and the threads in the opening, that normally will prevent turning of the bushing after the hex head 100 engages the end of member 90 except when a wrench is applied. Between the ends of the bifurcated arm 90, the pin 110 is provided with an enlarged, eccentric portion 112, which is threaded and in an opposite direction, and with threads of multiple form which are finer and have a greater pitch. This eccentric portion of the pin is threaded through the upper end of the mounting member 114 and such end of the mounting member 114 has a threaded portion of clamping character through which the threaded pin first may be threaded and then locked thereto by means of a bolt 116. In certain of the claims, threads of different "lead" are recited, and in such claims, the term "lead" is used in a generic sense, as comprehending a relation in which the threads are of the same hand but are of different pitch, as well as threads which are of different hand.

When the parts are assembled properly, the clamping bolt 96 will tightly hold the bushing 102 in place and prevent any slight longitudinal play on the threaded end of the pin, and the bolt 116 will clamp the mounting member to the pin. The threaded wedging engagement of the bushing 98 with the threaded opening 92 is sufficient to hold the bushing 98 in place and prevent turning thereof in the opening. Accordingly, a very positive lock is provided for preventing loosening of the parts of the joint while permitting relative turning of the mounting member and pin relative to the bushings.

The outer ends of the bushings 98 and 102 may be closed by means of Welch plugs 118 which may be apertured to receive grease fittings 120. One of the fittings 120 may be welded or otherwise secured in place while the other fitting 120 is threaded into the disc so as to permit its removal. The corresponding outer end of the threaded portion of the pin 110 has a socket 122 to permit inserting a suitable tool through the opening into which the fitting is threaded and when the latter is removed, a suitable tool may be inserted to turn the pin.

The assembly of the joints shown in Figs. 3 and 4 may follow in general the assembly procedure outlined above with reference to the embodiment of Figs. 1 and 2, and it may also follow specifically the assembly procedure outlined in the above identified co-pending application Serial No. 698,715, filed November 18, 1933.

It would be practical to provide a similar joint between the lower link member and the lower end of the mounting member but ordinarily one adjustable connection will be sufficient to take care of the castering and camber angles of the wheel. This adjustable connection might be located at either end but is located in the particular instance at the upper end of the mounting member. If only one adjustable connection is provided, it may be preferable to use the same joint in the other connection but to provide the pin with the same thread throughout its length and to clamp the end of the mounting member about the intermediate portion of the pin.

In adjusting the castering and camber angles, the clamping bolt 116 is loosened, the nut 88 is loosened to permit stem 86 to turn and the fitting 120 is removed. A suitable tool then is inserted into engaging relation with the socket 122 and upon turning the tool, the pin 110 turns and owing to the thread on the ends of the pin being opposite as compared to the threads on the intermediate portion, the mounting member 114 is moved lengthwise of the pin 110. Owing to the greater pitch of the central multiple thread on the pin, a pronounced movement of the mounting member may be obtained with only a small longitudinal travel of the pin relative to the arm 90 from which it follows that the bearing bushings may be shorter and a smaller space may be provided between the ends of the pin and the grease fitting plugs.

It will be appreciated that the foregoing rotative movement of the pin 110, in addition to effecting the just described adjustment of the castering angle, also affords an adjustment of the camber angle in the same manner as described with reference to Figs. 1 and 2 due to the bodily movement of the eccentric mid-section 112. It is to be noted that the pitches and leads of the threads on the intermediate or end sections of the pin are preferably so related to the degree of eccentricity of the mid-section 114 that a complete revolution of the pin, which complete revolution will, of course, cause no net change in the camber angle, causes only a relatively minor adjustment of the castering angle of the wheel. In this way, if a castering adjustment is desired without causing a corresponding camber adjustment, the pin 110 may be rotated through a single complete revolution or revolutions. After making the adjustment, the fitting 120 is inserted and clamping bolt 116 and nut 88 are again tightened which causes the parts to be firmly held in relative positions, although permitting oscillatory movement of the link members and mounting member.

The invention provides a simple and efficient joint connection in the individually sprung front wheel mounting for adjusting and obtaining the proper castering and camber angles and furthermore, provides a joint which will allow pivotal movement of the link and mounting members and transverse adjustment thereof while insuring that the several parts of the joint will be positively held against loosening during operation of the vehicle. Also a joint is provided which does not require removal of any parts except one of the grease fittings in making adjustments, thereby simplifying the adjusting procedure.

Although only two forms of the invention have been illustrated and described in detail, it will be apparent to those skilled in the art that various modifications may be made without departing from the scope of the appended claims.

What is claimed is:

1. A pivotal and adjustable joint comprising a pair of members one of which has apertured and spaced arm portions and the other an apertured portion disposed between said arm portions, a pin extending through all of the apertures and having its opposite ends similarly threaded, the intermediate portion of the pin being eccentric and threaded, thread means in the apertures in the arm portions for receiving the threaded ends of the pin, thread means in the aperture in the other member to receive the threaded eccentric portion of the pin, and means for releasably locking one of the members to the pin for causing the pin to turn with said last mentioned one member during relative pivotal movement of the members.

2. In a vehicle wheel suspension, a supporting member having spaced arm portions having internally threaded axially aligned apertures therein, a wheel mounting member extending between said spaced arm portions and having an internally threaded aperture axially parallel with the arm apertures, a pin having axially aligned threaded end portions threadably matching and engaging the apertures in the arm portions, respectively, and an offset threaded intermediate portion threadably matching and engaging the aperture in the wheel mounting member, and means releasably locking the pin against rotation relative to one of said members so that relative pivotal movement of one member relative to the other causes the pin to pivotally turn on the threads in the other member, and so that when the locking means is released, turning of the pin relative to both members adjusts the relative positions of the members.

3. In a vehicle wheel suspension, a supporting member having spaced arm portions having internally threaded axially aligned apertures therein, a wheel mounting member extending between said spaced arm portions and having an internally threaded aperture axially parallel with the arm apertures, the threads in the apertures in said members being of like lead and pitch, a pin having axially aligned threaded end portions threadably matching and engaging the apertures in the arm portions, respectively, and an offset threaded intermediate portion threadably matching and engaging the aperture in the wheel mounting member, and means releasably locking the pin against rotation relative to one of said members so that relative pivotal movement of one member relative to the other causes the pin to pivotally turn on the threads in the other member, and so that when the locking means is released, turning of the pin relative to both members adjusts the relative positions of the members.

4. In a vehicle wheel suspension, a supporting member having spaced arm portions having internally threaded axially aligned apertures therein, a wheel mounting member extending between said spaced arm portions and having an internally threaded aperture axially parallel with the arm apertures, the threads in said last-mentioned aperture having a lead different than that of the threads in the other apertures, a pin having axially aligned threaded end portions threadably matching and engaging the apertures in the arm portions, respectively, and an offset threaded intermediate portion threadably matching and engaging the aperture in the wheel mounting member, and means releasably locking the pin against rotation relative to one of said members so that relative pivotal movement of one member relative to the other causes the pin to pivotally turn on the threads in the other member, and so that when the locking means is released, turning of the pin relative to both members adjusts the relative positions of the members.

5. A pivotal and adjustable joint comprising a pair of members one of which has apertured and spaced arm portions and the other an apertured portion disposed between said arm portions, a pin extending through all of the apertures and having its opposite ends similarly threaded, the intermediate portion of the pin being eccentric and threaded, thread means in the apertures in the arm portions for receiving the threaded ends of the pin, thread means in the aperture in the other member to receive the threaded eccentric portion of the pin, the thread means in the apertures in said members being of like lead and pitch, and means for releasably locking one of the members to the pin for causing the pin to turn with said last mentioned one member during relative pivotal movement of the members.

6. A pivotal and adjustable joint comprising a pair of members one of which has apertured and spaced arm portions and the other an apertured portion disposed between said arm portions, a pin extending through all of the apertures and having its opposite ends similarly threaded, the intermediate portion of the pin being eccentric and threaded, thread means in the apertures in the arm portions for receiving the threaded ends of the pin, thread means in the aperture in the other member to receive the threaded eccentric portion of the pin, the thread means in the apertures in said arm portions being of lead different than that of the thread means in the aperture in the other member, and means for releasably locking one of the members to the pin for causing the pin to turn with said last mentioned one member during relative pivotal movement of the members.

JOHN W. LEIGHTON.